United States Patent [19]
Noreen et al.

[11] Patent Number: 5,689,245
[45] Date of Patent: Nov. 18, 1997

[54] INTEGRATED COMMUNICATIONS TERMINAL

[75] Inventors: Gary Noreen, La Cañada Flintridge, Calif.; Theodore R. Harper, Apex, N.C.; Ken Renshaw, Manhatten Beach, Calif.

[73] Assignee: Radio Satellite Corporation, La Canada Flintridge, Calif.

[21] Appl. No.: 469,608

[22] Filed: Jun. 6, 1995

Related U.S. Application Data

[63] Continuation-in-part of Ser. No. 963,233, Oct. 19, 1992, Pat. No. 5,455,823.

[51] Int. Cl.[6] .................................. H04Q 1/00
[52] U.S. Cl. ............... 340/825.49; 370/329; 340/825.44
[58] Field of Search ................... 340/825.44, 825.49; 370/328, 329

[56] References Cited

U.S. PATENT DOCUMENTS

| | | | |
|---|---|---|---|
| 3,683,116 | 8/1972 | Dill | 179/15 |
| 4,178,476 | 12/1979 | Frost | 340/825.44 |
| 4,425,639 | 1/1984 | Acampora et al. | 370/50 |
| 4,437,183 | 3/1984 | Profet | 370/110.1 |
| 4,470,788 | 9/1984 | Konneker | 340/825.49 |
| 4,501,002 | 2/1985 | Auchterlonie | 375/86 |
| 4,599,734 | 7/1986 | Yamamoto | 375/40 |
| 4,625,235 | 11/1986 | Watson | 358/86 |
| 4,635,247 | 1/1987 | Tejima | 370/13 |
| 4,635,285 | 1/1987 | Coombes | 379/63 |
| 4,660,196 | 4/1987 | Gray et al. | 370/109 |
| 4,706,121 | 11/1987 | Young | 358/142 |
| 4,720,873 | 1/1988 | Goodman et al. | 455/2 |
| 4,742,512 | 5/1988 | Akashi et al. | 370/96 |
| 4,752,951 | 6/1988 | Konneker | 340/825.49 |
| 4,754,465 | 6/1988 | Trimble | 375/1 |
| 4,759,016 | 7/1988 | Otsuka | 370/95 |
| 4,837,786 | 6/1989 | Gurantz et al. | 370/20 |
| 4,852,090 | 7/1989 | Borth | 370/104 |
| 4,868,811 | 9/1989 | Suzuki | 370/50 |
| 4,870,660 | 9/1989 | Keate | 375/88 |
| 4,882,730 | 11/1989 | Shinmyo | 370/95.2 |
| 4,903,320 | 2/1990 | Hanawa | 455/34 |
| 4,914,517 | 4/1990 | Duffield | 358/191.1 |
| 4,951,279 | 8/1990 | Hotta | 370/75 |
| 5,027,400 | 6/1991 | Baji et al. | 380/20 |
| 5,036,389 | 7/1991 | Morales | 358/84 |
| 5,057,915 | 10/1991 | Von Kohorn | 358/84 |
| 5,134,719 | 7/1992 | Mankovitz | 455/154.1 |
| 5,161,019 | 11/1992 | Emanuel | 358/183 |
| 5,539,395 | 7/1996 | Buss | 340/825.44 |

FOREIGN PATENT DOCUMENTS 60-261232  12/1985  Japan .................. H04B 7/15

Primary Examiner—Brian Zimmerman
Attorney, Agent, or Firm—David Newman & Associates, P.C.

[57] ABSTRACT

An electronic device for use as a communications terminal including means for determining a location of the electronic device, means for storing that location in the electronic device, means for receiving a wide-area broadcast, and means for executing location-specific instructions contained within the wide-area broadcast, responsive to the stored location. The invention further comprises a method for delivering a data channel signal having a plurality of location-dependent instructions, from a transmitter to a plurality of receiving units. The method comprises the step of transmitting the data channel signal to the plurality of receiving units. Once received by a particular receiving unit, the particular receiving unit identifies and executes location-dependent instructions within the data channel signal which correlate with the location of the particular receiving unit as stored in that receiving unit. The location of the particular receiving unit may be determined internal or external to the particular receiving unit and may be transmitted to the particular receiving unit as part of the data channel signal.

22 Claims, 8 Drawing Sheets

FIG. 9

| BEAM | FREQUENCY, MHz | DATA RATE, kbps |
|---|---|---|
| 1 | 1559.000 | 60 |
| 2 | 1559.200 | 20 |
| 3 | 1559.400 | 40 |
| 4 | 1559.600 | 70 |

FIG. 10

| NAME | FREQUENCY, MHz | DATA RATE, kbps |
|---|---|---|
| CLASSICAL | 1555.100 | 60 |
| COUNTRY | 1554.750 | 60 |
| CSN | 1555.350 | 16 |
| EDUCATIONAL | 1556.400 | 16 |
| JAZZ | 1557.200 | 60 |
| KIDS | 1553.800 | 16 |
| NEWS | 1556.250 | 16 |
| ROCK | 1558.050 | 60 |
| SPORTS | 1558.200 | 16 |
| TALK | 1553.250 | 16 |

INTEGRATED COMMUNICATIONS TERMINAL

RELATED PATENTS

This patent is a continuation-in-part of patent application entitled, INTEGRATED COMMUNICATIONS TERMINAL, having Ser. No. 07/963,233 and filing date Oct. 19, 1992, now U.S. Pat. No. 5,455,823. The benefit of the earlier filing date of the parent patent application is claimed pursuant to 35 U.S.C. § 120.

BACKGROUND OF THE INVENTION

This invention relates to communications networks and more particularly to a mobile station for communicating through satellite networks which allows greatly expanded access by the travelling public, such as mobile radio users, to diverse audio programming sources, communication services, and navigation services. This invention is also applicable to digital mobile communications, subscriber radio communications, and similar systems.

DESCRIPTION OF THE RELEVANT ART

New communications satellites, capable of communicating with mobile stations through small, light-weight, inexpensive antennas, are under development and are planned for operation in the mid 1990's. These satellites are expected to provide mobile satellite services, including two-way mobile telephony and data services, to commercial users, such as truck drivers, and to government users, such as law enforcement and public safety organizations. The number of users served, particularly with two-way telephony service, is small due to economic, technical and regulatory limits on satellite capabilities and use of radio frequencies.

The new communications satellites would be of much greater benefit to the general public, and provide greater potential revenue to mobile satellite system operators, if mobile stations capable of communicating through the new communications satellites were compact, relatively inexpensive mass market consumer items, similar to AM/FM car radios, and capable of being used by a large percentage of the travelling public. This is possible only if there were widespread public demand for mobile satellite services.

At present, there is relatively little public demand for the telephony and data services planned with the new mobile satellite systems; however, significant public demand does exist for additional audio entertainment programming, such as radio music, talk shows, and programming that has wider geographic coverage which also does not fade or disappear during travel.

Mobile radio listeners generally have not received the benefits of diverse programming and narrowcasting alternatives available to television viewers and radio listeners in their homes through existing cable and satellite distribution networks. The prospect of additional, alternative programming beyond existing AM and FM units becoming available to the travelling public is poor. Terrestrial implementation of proposed new digital audio broadcasting systems, which face significant technical and regulatory barriers, still does not resolve problems relating to poor radio coverage of areas of low population density; however, such remote areas could be easily served by satellite. Proposed new satellites dedicated to radio broadcasting, if ever authorized and constructed, are many years away.

In addition to an earlier implementation, the use of currently authorized mobile satellites for audio broadcasting has other distinct advantages over the use of proposed new satellites dedicated to radio broadcasting, since the L-band spectrum of mobile satellite systems is better for this purpose than the higher frequencies proposed for the broadcasting satellites. In addition, the proximity of radio frequencies involved allows audio programming through the mobile satellite systems to be easily and economically integrated with other communications features of the mobile satellite systems as well as navigation data broadcasts from the U.S. government Global Positioning System (GPS).

In spite of these advantages, the communications satellite industry has had the belief that continuous broadcasting of audio programming and high-rate digital data are not possible through the presently authorized mobile satellites for various reasons.

Principal among these reasons are the following:

1. All providers of services through the mobile satellite systems presently authorized are required by regulation to be capable of immediately vacating mobile satellite spectrum required for emergency communications. Consumer entertainment broadcast systems cannot meet this requirement, because broadcast channels could not be shut down or relocated in frequency without unacceptable disruption of service to listeners.

2. Since satellite capacity is limited, only a few entertainment channels could be broadcast through a mobile satellite, limiting the public appeal of a radio satellite broadcast system.

3. The broadcasting of enough high quality music entertainment programming to attract widespread public interest in the satellite service requires a significant portion of the capacity of a mobile satellite, resulting in high costs for such broadcasts. These high costs make the broadcasting of high quality music uneconomical.

4. To be readily accepted by the public, consumer mobile communications receivers must be compact and lightweight. Present mobile satellite receivers are generally too large and too heavy for consumer applications, because the limited production runs of these receivers do not justify the large initial costs of miniaturization of all components.

Prior art communications systems employing multiple channel receivers do not use separate control channels as well as selectable channels simultaneously received by communicating units, with such units being mobile or stationary, and the prior art does not use the control channel to convey information other than control information to communicating units. Some non-control information is more appropriately sent through a common message/control channel in order for such non-control information to be accessible to all communicating units or to communicating units that are tuned to different selectable channels, where such selectable channels are defined to be channels which may be assigned to an available frequency by the system controller or selected by the user. Also, prior art communications systems do not have a ground unit capable of receiving a message/control channel including various types of low data rate time-division-multiplexed information and, simultaneously, a second high-rate channel selected by the user from among a group of frequency-division-multiplexed high data rate channels identified by information delivered through the message/control channel. In addition, prior art communications systems do not include receiving units capable of storing location information and, responsive to that stored location information, of acting upon specific location-dependent instructions received as part of a wide-area broadcast.

The present invention, by its improvements over the prior art, resolves the principal problems with consumer broadcasts over the new communications satellites. Frequency control in mobile satellite communications systems is well known in the art, such as discussed in the analysis of COMSAT Laboratories for the Jet Propulsion Laboratory in Volumes I and II of "Final Report: Design of an MSAT-X Transceiver and Related Ground Segment Technology, February 1986".

Oscillator inaccuracies and Doppler effects caused by the motion of the satellite and of the mobile station can introduce significant frequency errors in a mobile satellite system. Such frequency errors may require the use of wide guard bands, resulting in an inefficient use of the available spectrum. Preferably, the mobile satellite system should be designed to minimize frequency errors.

There are only a few fixed transmit units. Expensive, highly stable oscillators can be used to minimize frequency errors in the forward direction, i.e. from fixed unit to mobile station. For example, oscillators having $10^{-9}$ long-term stability may be used to provide an absolute frequency error of about ±2 Hz at a frequency around 1600 MHz, which results in a minimal frequency uncertainty at the fixed unit.

The objective of forward link frequency control is to have fixed units transmitting at frequencies which are received by mobile stations at frequencies as close as possible to the receiver frequencies expected by the mobiles, with the transmit frequency capable of being adjusted by each fixed unit to minimize the received signal frequency error.

A reference unit at a fixed station can be used in a feedback loop to minimize forward link frequency error at the mobile station. The reference unit may include a terminal or a station for transmitting and receiving transmissions. With such a feedback loop, the fixed station transmits at the assigned backhaul frequency and monitors the frequency at which the reference unit receives the transmission. By comparing the frequency offset of the actual received signal to the frequency at which the received signal should have been received, the fixed station can determine how to adjust the transmit frequency of the fixed station to compensate for satellite oscillator instabilities and Doppler effects caused by satellite drift. The fixed station acts to minimize the offset between the frequency of the actual received signal and the frequency at which the received signal should have been received.

Each mobile station thus receives signals relayed through a satellite at frequencies quite close to the correct frequencies. However, there are some additional Doppler effects caused by the motion of the mobile station. Such additional Doppler effects are typically less than ±100 Hz at frequencies around 1600 MHz, so the received frequency is typically within 100 Hz of the correct frequency, and a carrier tracking loop in the mobile station should be able to easily lock onto the received signal.

In the return direction, i.e. mobile station to fixed station, relatively unstable local oscillators must be used, typically with $10^{-6}$ long term stability, leading to frequency errors of ±2 kHz. Fortunately, each mobile station can phase lock to one or more received channels and can use the phase locked frequency as a frequency reference for the transmit frequency. For example, at frequencies around 1600 MHz, the maximum error in transmit frequency using such relatively unstable oscillators is under ±400 Hz, which includes mobile-generated Doppler effects in both directions, as well as return link satellite-generated Doppler effects.

The error can potentially be reduced still further through the use of GPS-derived mobile Doppler estimates generated at the mobile station and with satellite return link Doppler compensation estimates generated by a network center and broadcast to the mobile station.

Objects of the Invention

An object of the invention is a compact mobile communications transmitter/receiver, allowing high flexibility in integration and modification of communications services, efficient use of radio spectrum, and easy implementation of new services.

Another object of the invention is a compact mobile communications receiver allowing high flexibility in integration and modification of communications services, efficient use of radio spectrum, and easy implementation of new services.

An object of the invention is a mobile satellite system permitting the integration of digital audio broadcast services with personal communications services and navigation services into low-cost mobile radios.

Another object of the invention is to provide a mobile satellite system allowing a wide array of integrated mobile radio services to consumers, business users and government agencies via low-cost mobile stations. The services may include alphanumeric and voice paging, one-way and two-way voice and data communications, navigation, broadcast data, and audio broadcasting services.

Another object of the invention is to optionally allow integration of microprocessors designed to analyze signals from navigation satellites, such as the U.S. Global Positioning System, with a mobile station, so that navigation satellite broadcasts and differential corrections sent through the mobile satellite could be used by the mobile station to estimate the position of the mobile station, as well as the position of the vehicle in which the mobile station may be located, within one or two meters.

An additional object of the invention is an electronic device for use as a communications terminal and capable of storing information on the location of the electronic device and of using that location information to determine specific location-dependent portions of a wide-area broadcast upon which to act.

A further object of the invention is a low-cost mobile station allowing additional voice and data channels to be provided to many users throughout the country who are currently underserved.

An additional object of the invention is a consumer device that allows reception of audio and data broadcasts that can vary in bandwidth and in spectrum location.

An additional object of the invention is a low-cost mobile satellite network having an emergency broadcast capability virtually immune from natural disaster and independent of the existing terrestrial radio network.

A further object of the invention is to provide innovative mobile services, such as digital audio broadcasts, facsimile broadcasts, stock market data broadcasts, and many others, through a low-cost integrated mobile station.

A still further object of the invention is to bring diverse communications services to the public at very low cost.

SUMMARY OF THE INVENTION

According to the present invention, as embodied and broadly described herein, an integrated communications terminal embodied as a microchip processor, preferably incorporated into one or a small number of semiconductor microchips, is provided comprising a selectable channel demodulator; a selectable channel decoder; a time division multiplex (TDM) channel demodulator; a TDM channel decoder; control means that includes a programmable, nonvolatile memory; an audio decompressor; a digital-to-audio (D/A) converter; and a data coder and modulator. The microchip processor is used with a mobile station having a message display, an input device, RF electronics, an antenna assembly, an audio amplifier and speakers, and, optionally, a transmitter for return link communications.

The RF electronics convert a received electromagnetic signal to a received intermediate frequency (IF) signal. The optional transmitter, in response to a transmitter frequency command signal generated by the control means, selects and adjusts a carrier signal frequency, amplifies a data-modulated signal as an amplified data-modulated signal, and transmits the amplified data-modulated signal.

The audio decompressor operatively is coupled to the selectable channel decoder. The audio decompressor decompresses the selectable-data signal as a digital audio signal.

The D/A converter is operatively coupled to the audio decompressor. The D/A converter converts the digital audio signal to an analog audio signal which is delivered to an audio amplifier and speakers, to a handset, or to a headset.

The TDM channel demodulator operatively is coupled to the RF electronics, to the control means, and to the local oscillator. Using a TDM data rate and frequency command signal generated by the control means and a frequency reference from the local oscillator, the TDM channel demodulator generates a demodulated TDM channel signal and a frequency-error signal. The TDM channel decoder, which is coupled to the TDM channel demodulator, decodes the demodulated TDM channel signal as a TDM-data signal.

The control means operatively is coupled to the TDM channel decoder, to the RF electronics, and optionally to the transmitter. The control means decommutates the TDM-data signal as a control signal, and as paging signals and other message or information signals. To commutate is herein defined to mean the same as to interchange and/or to assemble collected data, and to decommutate is herein defined to mean the same as to disassemble or to break apart a signal or collection of data into component signals or component groups of data.

The control signal includes data which constitute look-up tables broadcast periodically that identify the name, radio frequency location, and data rate of the selectable channels and the TDM channel. The look-up tables are stored by the control means, and the look-up tables are updated periodically. The control means uses the data in the look-up tables to identify and tune-in broadcasts to the selectable channels. The control means, in response to the control signal and/or memory, generates the selectable data rate and frequency command signals and the TDM data rate and frequency command signals that tune the selectable channel demodulator and the TDM channel demodulator, respectively. The control means outputs the message signals to memory for message storage and/or to the message display.

The control means is further coupled operatively with an input device, a data coder and modulator, and an optional transmitter. In response to data signals from the input device and/or in response to the control signal, the control means sends a formatted data signal to the data coder and modulator.

In response to formatted data signals from the control means, the data coder and modulator, coupled to the transmitter, encodes the formatted data signals and modulated the transmit IF frequency to a data-modulated signal, and sends the modulated signal to the transmitter for amplification and transmission.

The selectable channel demodulator operatively is coupled to the RF electronics and to the control means. Using the selectable data rate and frequency command signal generated by the control means, the selectable channel demodulator demodulates the received IF signal for output as a demodulated selectable channel signal. The selectable channel decoder, which is coupled to the selectable channel demodulator, decodes and deinterleaves the demodulated selectable channel signal as a selectable-data signal. The selectable-data signal is delivered from the selectable channel decoder to either a digital interface or to an audio decompressor.

The mobile station may optionally include a voice input processor to provide for two-way voice conversations. The voice input processor is operatively coupled to the data coder and modulator, as well as coupled to a voice input device, such as a handset, a microphone, or a headset with a microphone. The voice input processor converts an analog voice signal from the voice input device to a compressed digital voice signal which is delivered to the data coder and modulator.

The present invention, when used with a satellite system capable of communicating with compact mobile stations, offers the benefits of integrated nationwide personal communications and navigation services. These services include paging, in both alphanumeric formats and voice formats; two-way voice and data communications; broadcast data and audio entertainment programming; and a low-cost navigation service and a precision navigation capability. The present invention is extraordinarily flexible in delivery of services.

With the integrated communications terminal of the present invention, consumers may listen to high quality audio entertainment broadcasts nearly everywhere that the consumers go, through a spectrum efficient system that can receive transmissions of different bandwidths and data content. The consumers may communicate while on the move from virtually anywhere in the country at low cost. They may obtain these and other services through low-cost, integrated car radios. The radio satellite system enabled by the present invention offers a revolution in mobile communications capability for consumers everywhere in the United States.

The utility of this invention is not limited to satellite communications. This invention could be incorporated into any communications system, whether originating from terrestrial, aircraft or marine sources, using radio, lasers, wire signal or other delivery systems, first, where it is desired that the mobile station receive simultaneously background messages and information stored in memory or displayed to the user as well as a foreground channel of entertainment or other communications selected by the user from among a group of available foreground channels; and second, the data rate, the frequency location, and/or the number of the available foreground channels may change over time.

The present invention also offers the capability of transmitting location-specific instructions through a determination of the location of receiving units and the transmission of a plurality of location-dependent instructions as part of a wide-area broadcast to a plurality of receiving units. As used in this patent, "wide-area" may be defined to include an area of sufficient geographic scope to legitimize the transmission of a plurality of location-dependent instructions. Upon receipt of the wide-area broadcast, the receiving units execute only those location-dependent instructions corresponding to the receiving units respective stored location information. The system of the present invention includes an electronic device for use as a communications terminal, having means for determining a location of the electronic device, means for storing that location in the electronic device, means for receiving a wide-area broadcast, and means for executing location-specific instructions contained within the wide-area broadcast, responsive to the stored location. The present invention further comprises a method for delivering a data channel signal having a plurality of location-dependent instructions, from a transmitter to a plurality of receiving units. The method comprises the steps of transmitting the data channel signal to the plurality of receiving units. Once received by a particular receiving unit, the particular receiving unit identifies and executes location-dependent instructions within the data channel signal which correlate with the location of the particular receiving unit as stored in that unit. The location of the particular receiving unit may be determined internal or external to the particular receiving unit and may be transmitted to the particular receiving unit as part of the data channel signal.

This invention offers a flexible communications facility that can be used with a variety of peripheral devices. The basic configuration may provide high quality audio program material through standard vehicle radio speakers, and may also display alphanumeric paging or other data on appropriate display devices. Data processors; navigational map displays; facsimile machines, using a digital interface; two-way voice equipment, using a handset, voice encoders, and other electronics for the return channel. The use of an optional transmitter as part of the invention allows greatly increased utility by taking advantage of the two-way capabilities of mobile satellite systems.

Additional objects and advantages of the present invention are set forth in part in the description that follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 9 is an example of a TDM channel look-up table; and

FIG. 10 is an example of a selectable channel look-up table.

DETAILED DESCRIPTION OF THE PREFERRED EMBODIMENTS

Figure 1:
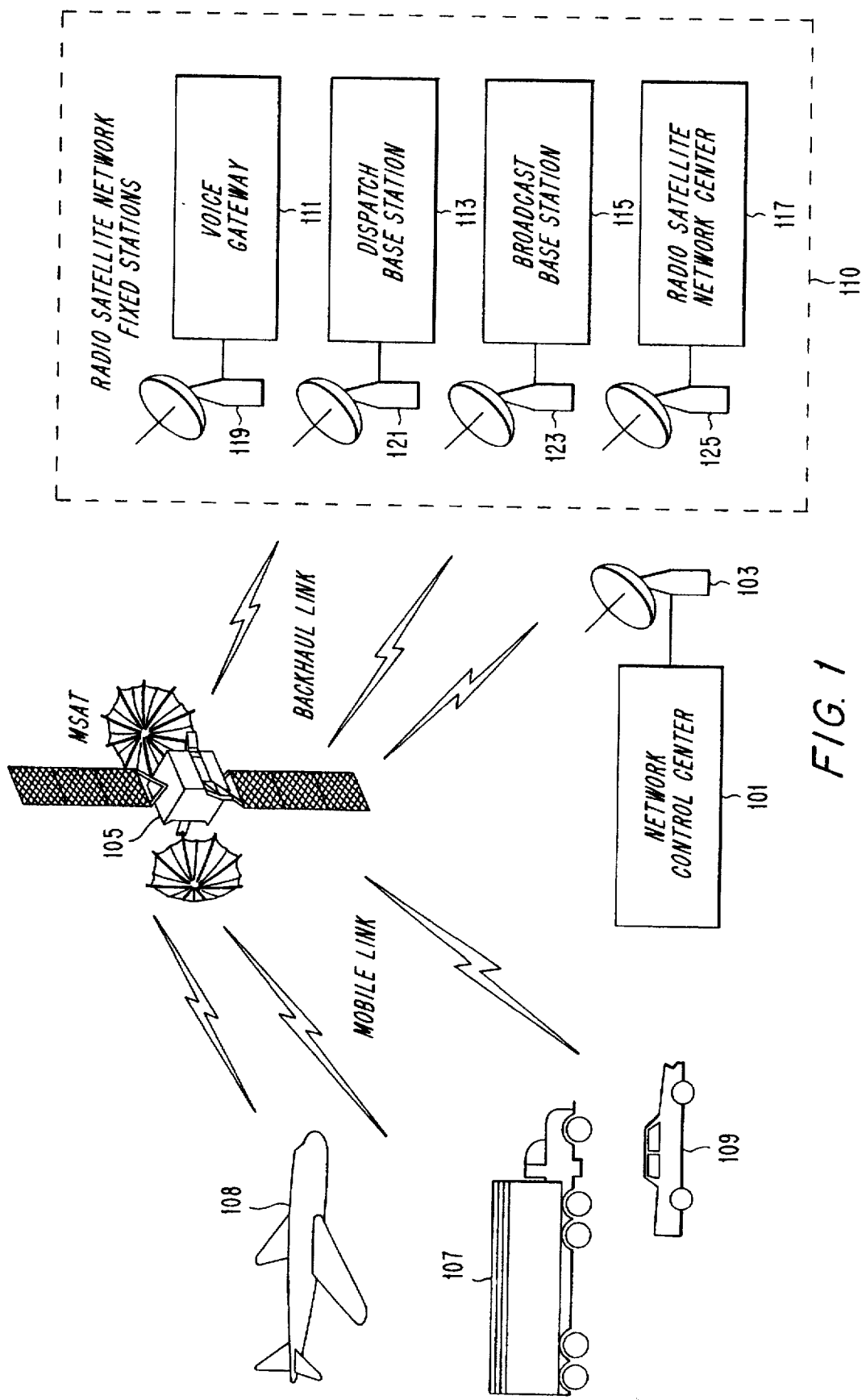
FIG. 1 is a radio satellite network diagram.

Reference is now made in detail to the present preferred embodiments of the invention, examples of which are illustrated in the accompanying drawings, wherein like reference numerals indicate like elements throughout the several views.

As illustratively shown in FIG. 1, a radio satellite network is shown comprising leased capacity on a satellite (MSAT) 105 capable of transmissions to mobile stations, a network control center 101, a plurality of fixed stations 110, and users having mobile stations 107, 108, 109. The network control center 101 is coupled through antenna 103 via a communications channel at an appropriate backhaul frequency such as $K_u$ band, to MSAT 105, with the backhaul frequency being the frequency of transmissions between a fixed station and the satellite. By way of example, the mobile users, using the mobile stations, are a truck 107, airplane 108 and automobile 109. The mobile users are coupled via a communications channel at an appropriate mobile communications frequency, such as L-band, to MSAT 105.

The network fixed stations 110 include voice gateway 111, dispatch base station 113, broadcast base station 115, and radio satellite network center 117. The voice gateway 111 is coupled through antenna 119 via a backhaul communications channel to MSAT 105. The dispatch base station 113 is coupled through antenna 121 via a backhaul communications channel to MSAT 105. The broadcast base station 115 is coupled through antenna 123 via a backhaul communications channel to MSAT 105. The radio satellite network center 117 is coupled through antenna 125 via a backhaul communications channel to MSAT 105.

The network control center 101 is responsible for the overall use of the satellite. The radio satellite network center 117 is subordinate to the network control center 101 and controls the radio satellite system described in the present invention. The voice gateway 111 interfaces telephone and other voice communications with the radio satellite network. The dispatch base station 113 provides voice dispatches, and the broadcast base station 115 provides digital audio and high rate data broadcasts, all directed to mobile stations as in the present invention.

The radio satellite network center 117 relays, through MSAT 105, a single Time Division Multiplex (TDM) channel in each mobile satellite beam 24 hours a day. The TDM channel controls all mobile stations in the beam and contains low rate data broadcasts such as alphanumeric pages and other short data messages, GPS differential corrections and integrity updates, stock updates, sport reports, weather reports, travel advisories and emergency alerts. These data are collected from various sources by the radio satellite network center 117, which then commutates, i.e. assembles, the collected data into one TDM channel for each mobile satellite beam. In the preferred embodiment, the radio satellite network center 117 of the present invention uses time division multiplexing (TDM) to commutate the collected data into one TDM channel for each mobile satellite beam. Each mobile station receives the TDM channel for the satellite beam in which the mobile station is located at all times whenever the mobile station is on. The data rate and frequency of the TDM channel are changed infrequently.

Additional selectable channels sent through MSAT 105 by the fixed stations 110 can have a wide variety of data rates and frequencies. Each selectable channel may be addressed or assigned to all mobile stations, to a group of mobile stations, or to an individual mobile station by information delivered through the TDM channel. This addressing may be accomplished by including location-dependent instructions which are executed by those mobile stations having locations, stored in mobile-station memory, corresponding to the specified location or geographic region associated with the location-dependent instructions. Selectable channels can include digital audio entertainment channels; facsimile broadcasts; a return link of two-way voice communication channels, with the return link being the link from the fixed station to the mobile station; or other data transmissions. Both the data rate and radio frequency location of each selectable channel can be changed relatively frequently.

The data rate and radio frequency location of each selectable channel that may be received by a plurality of mobile stations is sent periodically to all mobile stations in each MSAT beam through the TDM channel for the beam. This information is sent in a selectable channel look-up table; i.e. a data signal identifying data rates and radio frequency locations that also may include additional identifying information about each channel and about the contents of each channel, such as illustratively shown in FIG. 10. In particular, the selectable channel look-up table is sent through the TDM channel whenever there is a change in frequency or data rate of a selectable channel intended for reception by mobile stations. The selectable channel look-up table is stored in a programmable, non-volatile memory of a control means, embodied as a data processor and controller 223.

Each mobile station may simultaneously receive two channels: the TDM channel for the strongest MSAT beam in which the mobile station is located and one of the many selectable channels sent through MSAT that the mobile station is authorized to access. Both TDM channel and selectable channel transmissions are transmitted to all mobiles, where control information is sent over TDM channels for use to allow the selectable channels to be addressed to all mobile stations, to groups of mobile stations, or to individual mobile stations. This addressing may be accomplished by including location-dependent instructions which are executed by those mobile stations having locations, stored in mobile-station memory, corresponding to the specified location or geographic region associated with the location-dependent instructions.

This network architecture allows mobile stations simultaneous access to most services. For example, packet data and paging messages can be sent over the TDM channel. High rate data for such digital services as facsimile transmissions or high quality digital audio programming can be sent over the selectable channels.

The two-channel mobile station receiver design gives simultaneous access to all lower-data-rate services through the TDM channel while the mobile station is receiving one of many selectable channels. The design of the receiver also permits the radio satellite system operator to change the data rate and frequencies of selectable channels with great flexibility.

Figure 2:
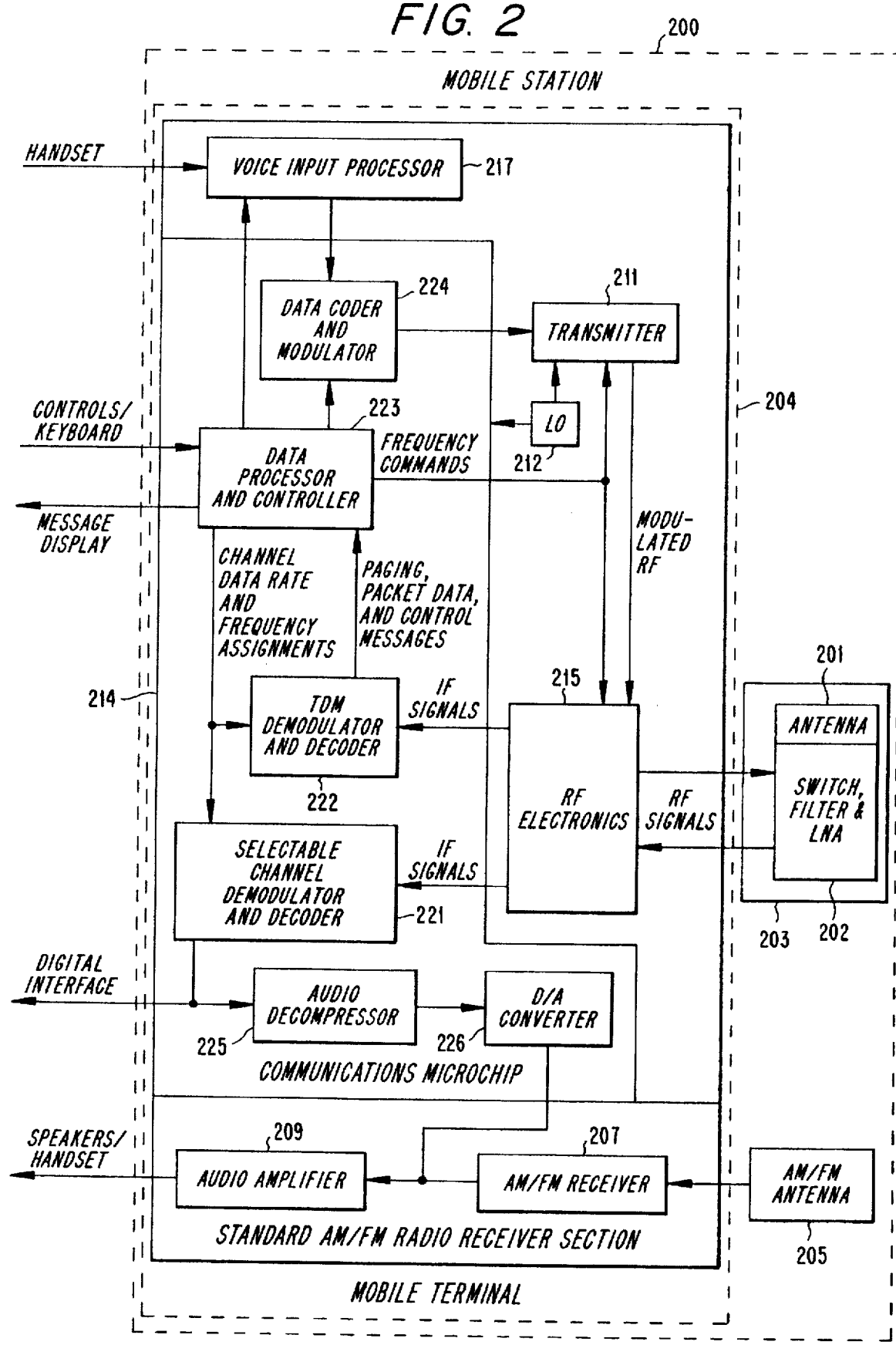
FIG. 2 is a block diagram of a mobile station.

In the exemplary arrangement shown in FIG. 2, a mobile station 200 comprises a communications microchip 214; an audio amplifier 209; an optional voice input processor 217; an optional transmitter 211; RF electronics 215; local oscillator 212; and antenna assembly 203. The antenna assembly 203 includes an antenna 201 and a transmit/receive switch, receive filter, and low noise amplifier (LNA) 202. The antenna 201 is coupled through switch, filter and LNA 202 to the RF electronics 215. The antenna 201 typically is an omnidirectional antenna, mounted on a vehicle roof, and is used for both transmitting and receiving. A mobile station 200 may include a conventional AM/FM receiver 207 connected to an AM/FM antenna 205. For optimum performance, the AM/FM antenna 205 and antenna 201 are separate and independent in use.

Mobile stations simultaneously receive two channels: a time division multiplex (TDM) channel and one of a plurality of selectable channels. Both TDM and selectable channel transmissions broadcast to all mobile stations; coding in the transmissions and in the received signals allows portions of broadcasts to be addressed to all mobile stations, to groups of mobile stations, or to individual mobile stations. This addressing may be accomplished by including location-dependent instructions which are executed by those mobile stations having locations, stored in mobile-station memory, corresponding to the specified location or geographic region associated with the location-dependent instructions. This architecture allows mobile stations simultaneous access to all services. For example, low rate data such as packet data and paging messages can be sent over the TDM channel, while high rate data for digital services such as facsimile machines or high quality digital program data such as music can be sent over the selectable channel. Broadcast transmissions can be interleaved to mitigate the effects of short-term fading.

As shown in FIG. 2, a user optionally can add transmitter 211 to the mobile station, providing the user with a two-way communications terminal. Low rate packet data messages may be generated automatically, such as by position reporting, or may be input from an input device, which may be embodied as an external keyboard or message generator. Such low rate packet data can be communicated back through MSAT 105. An optional voice input processor 217 may be included and may be embodied as a semiconductor chip. The voice input processor 217 digitizes and compresses voice signals to a selected bit rate, preferably in the 1200–9600 bps range, depending on the voice quality desired for transmission.

The voice input processor 217 is coupled to the data coder and modulator 224, with the data coder and modulator 224 being connected to the transmitter 211, and with the transmitter 211 being connected to the RF electronics 215, with the RF electronics 215, in turn, being connected to the antenna assembly 203.

A variety of peripheral devices may additionally be used with the mobile station. The basic configuration may provide compact disk quality program material through standard vehicle radio speakers, and may also display paging or other messages. Dispatch terminals, a handset for voice communications, or a headset and microphone for voice communication can also be added. A digital interface may also be included for facsimile machines or other functions.

The transmit/receive switch, filter and low noise amplifier (LNA) 202 isolates the transmitted RF signal from the mobile station. A signal from the receiver in the mobile station is received from MSAT 105 through antenna 201, and is amplified by LNA 202. Signals, including transmit/receive switch control signals, pass from the mobile terminal 204 mounted inside a vehicle to the antenna assembly 203 and from the antenna assembly 203 to the mobile terminal 204 by a common cable, with the common cable also providing power to the antenna assembly 203. Local oscillator (LO) 212 provides a frequency reference to transmitter 211 and communications microchip 214.

The communications microchip 214 includes a selectable channel demodulator and decoder 221, a TDM channel demodulator and decoder 222, control means embodied as a data processor and controller 223, audio decompressor 225, D/A converter 226, and data coder and modulator 224.

Broadly, the RF electronics 215 receive a signal from the antenna assembly 203 and convert the received signal to a selectable-IF signal and a TDM-IF signal, and the selectable-IF signal and the TDM-IF signal are each sent to the selectable channel demodulator and decoder 221 and to the TDM channel demodulator and decoder 222, respectively.

The RF electronics 215 also serve as a junction box for the common cable to the antenna assembly 203 and for the connection to the transmitter 211.

While the preferred embodiment uses quadrature-phase-shift-keying (QPSK) modulation, alternative embodiments of the microchip processor may be implemented to include other types off modulation, such as binary-phase-shift-keying (BPSK), Offset QPSK (O-QPSK), or Trellis Coded Modulation (TCM). Offset QPSK modulation, by way of example, might be used to minimize occupied bandwidth. Also, the interleaving of broadcast transmissions, such as bit interleaving, might be used for mitigating the effects of short-term fade.

Figure 3:
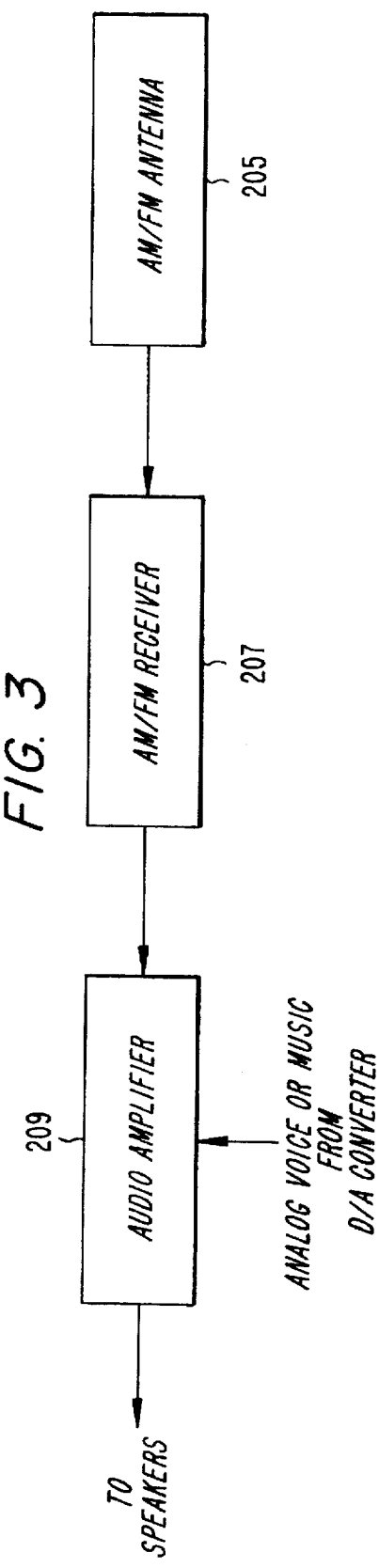
FIG. 3 is a block diagram of a terrestrial AM/FM receive chain.
Figure 4:
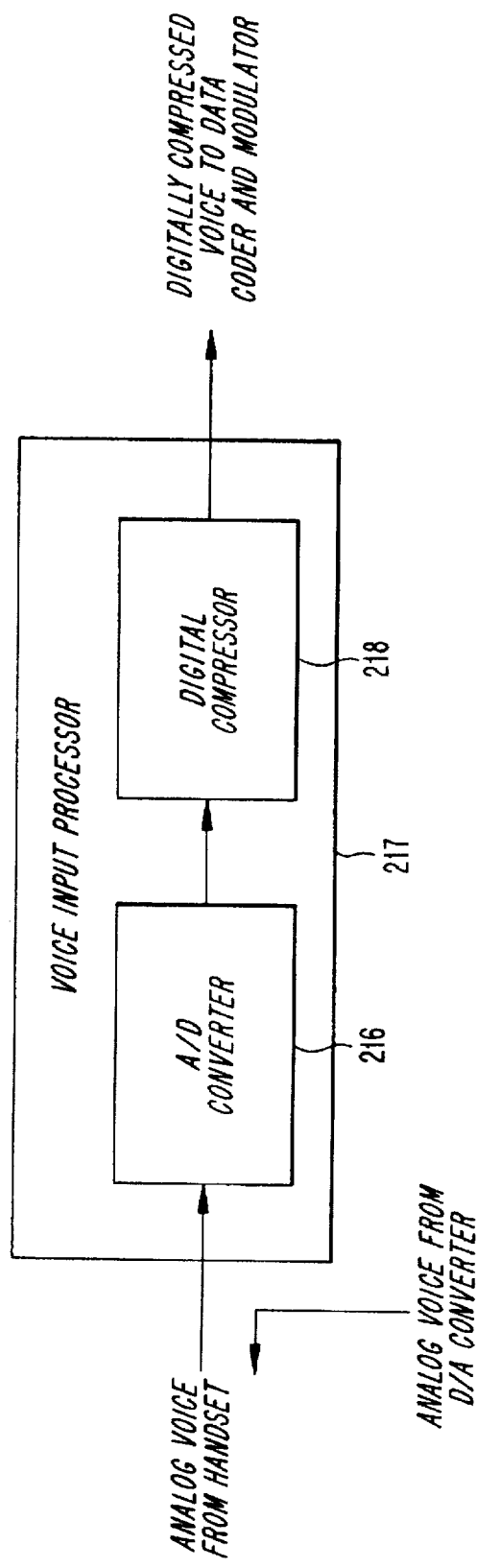
FIG. 4 is a block diagram of a voice input processor.

FIG. 3 shows a standard AM/FM receiver section including AM/FM antenna 205, AM/FM receiver 207, and audio amplifier 209, connected to speakers. FIG. 4 illustrates a voice input processor 217. Using the voice input processor 217, an analog voice signal from a handset is converted by voice input processor 217 using an A/D converter 216 to a digital voice signal, and a digital compressor 218 compresses the digital voice signal to reduce the data rate of the digital voice signal. The digitally compressed voice signal from the digital compressor 218 is sent to the data coder and modulator 224, which encodes and modulates the digitally compressed voice signal as a data-modulated signal, and sends the data-modulated signal to the transmitter 211.

Figure 5:
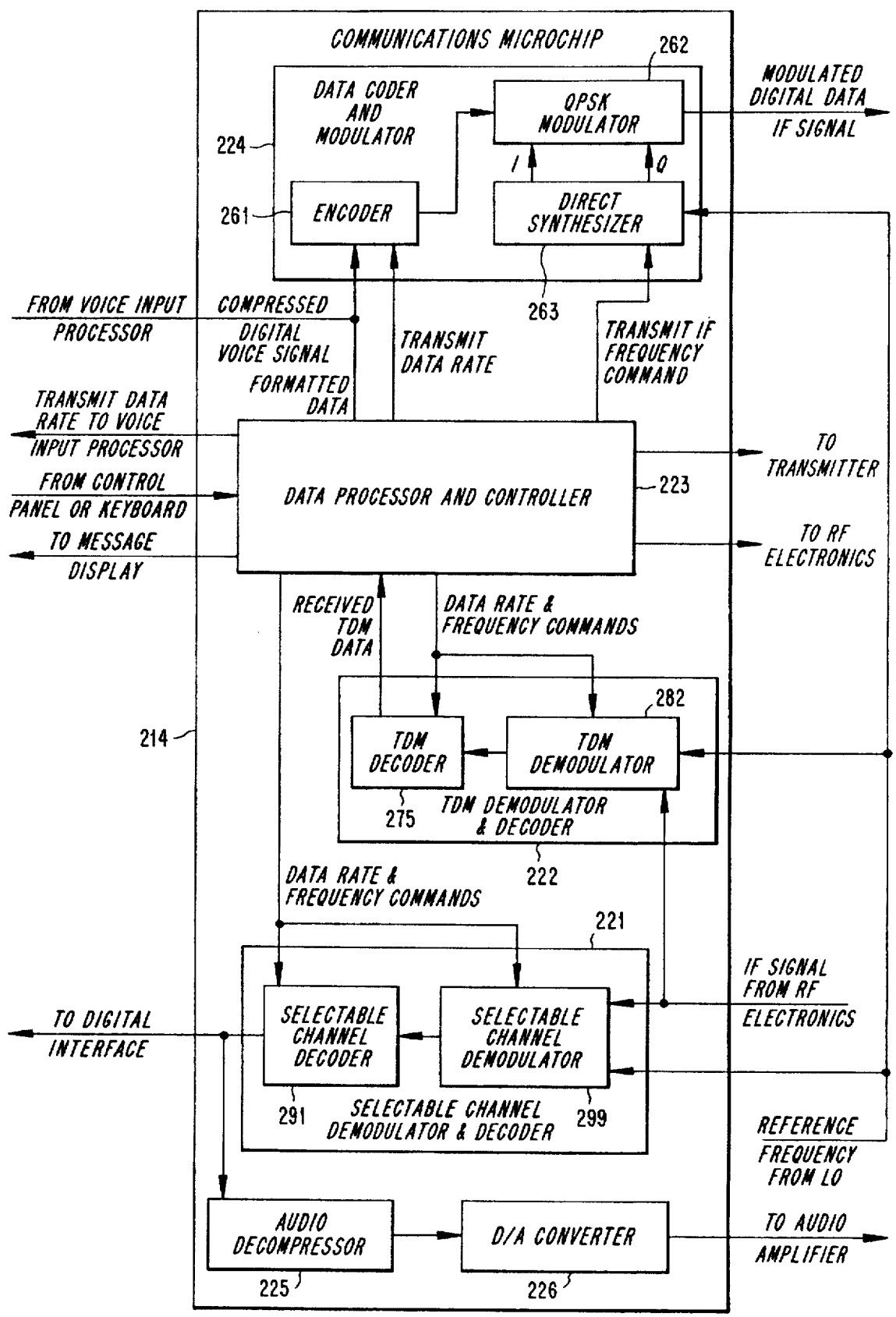
FIG. 5 is a block diagram of a communications microchip of the present invention.

In the exemplary arrangement shown in FIG. 5, the communications microchip 214 is embodied as a selectable channel demodulator and decoder 221, a TDM channel demodulator and decoder 222, control means, audio decompressor 225, D/A converter 226, and data coder and modulator 224. The control means is embodied as a data processor and controller 223. The selectable channel demodulator and decoder 221 may be further embodied as a selectable channel demodulator 299 and a selectable channel decoder 291. Also, the TDM channel demodulator and decoder 222 may be further embodied as a TDM channel demodulator 282 and a TDM channel decoder 275.

Figure 6:
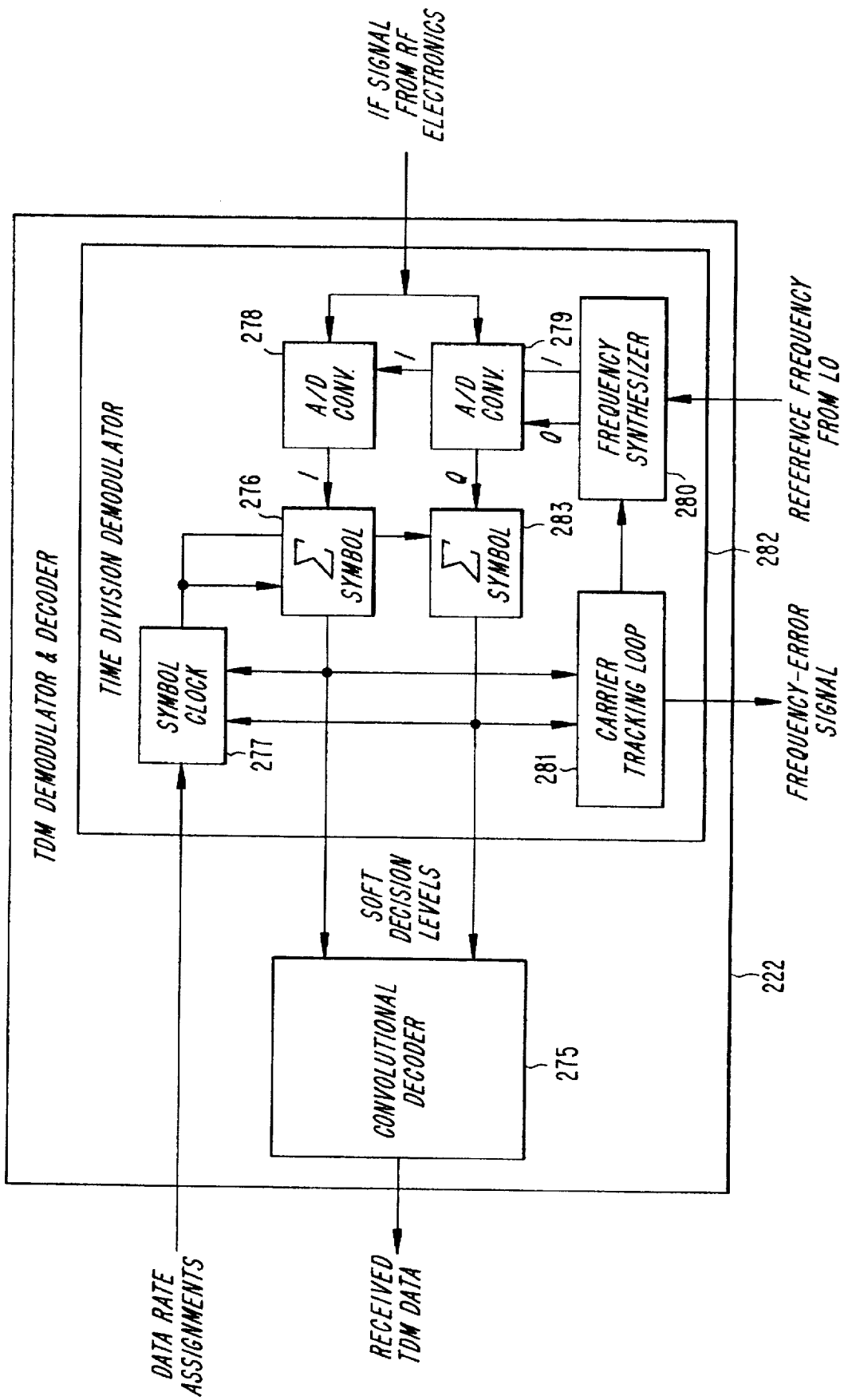
FIG. 6 is a block diagram of a TDM channel demodulator and decoder according to the present invention.

A block diagram of a TDM channel demodulator 282 is shown in FIG. 6. Referring to FIGS. 5 and 6, the TDM channel demodulator 282 operatively is coupled to the RF electronics and to the local oscillator 212. The TDM channel demodulator 282 receives, from the data processor and controller 223, a TDM data rate and frequency command signal, with the TDM data rate and frequency command signal including data rate information and frequency information for the TDM channel. In response to the TDM data rate and frequency command signal from the data processor and controller 223, the TDM channel demodulator 282, using symbol clock 277, adjusts, on initialization and thereafter, the electronics of the TDM channel demodulator 282 to accommodate received signals having various data rates and frequencies. The TDM channel demodulator 282, using carrier tracking loop 281, generates a frequency-error signal from the difference between the frequency, generated by a frequency synthesizer 280 in response to the local oscillator 212 and the TDM data rate and frequency command signal from the data processor and controller 223, and the frequency of the actual TDM channel receive frequency of the TDM-IF signal from RF electronics 215 as detected by the carrier tracking loop 281 in the TDM channel demodulator 282. The use of the locally generated frequency reference effectively predicts the TDM frequency with the use of the local oscillator 212. The TDM channel demodulator 282 demodulates the TDM-IF signal from RF electronics 215 to an in-phase and a quadrature-phase component, i.e. an in-phase TDM signal and a quadrature-phase TDM signal, respectively, by using appropriate in-phase and quadrature-phase circuitry. The TDM channel demodulator 282 also digitizes the in-phase TDM signal and quadrature-phase TDM signal using A/D converters 278, 279, and averages or filters the output of A/D converters 278, 279 using symbol devices 276, 283, respectively.

The TDM channel decoder 275 operatively is coupled to the TDM channel demodulator 282. The TDM channel decoder 275 convolutionally decodes the demodulated in-phase-TDM signal and the quadrature-phase-TDM signal from symbol devices 276, 283 as a TDM-data signal.

Figure 7:
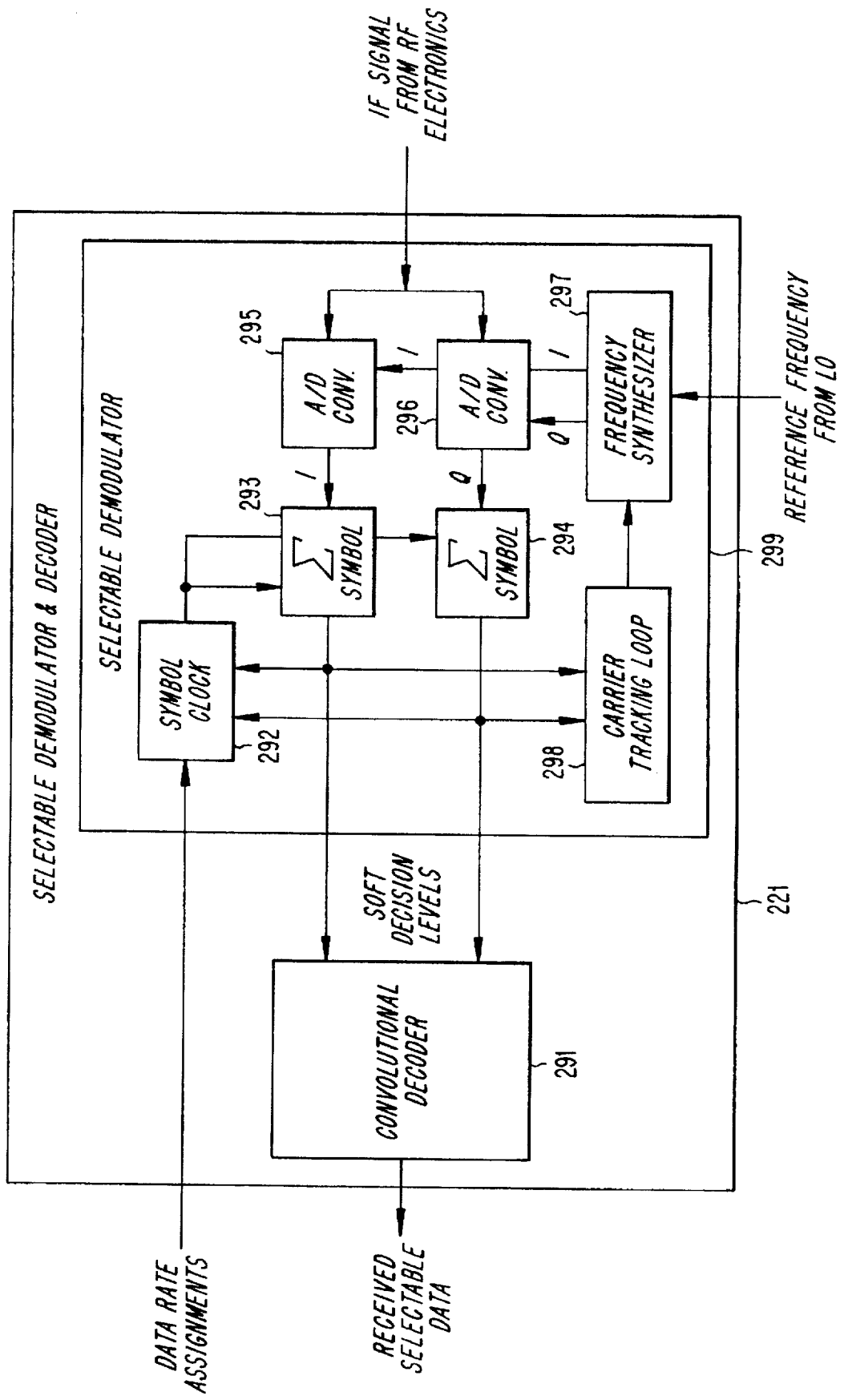
FIG. 7 is a block diagram of a selectable channel demodulator and decoder according to the present invention.

A block diagram of a selectable channel demodulator 299 shown in FIG. 7. Referring to FIGS. 5 and 7, the selectable channel demodulator 299 operatively is coupled to the RF electronics 215 and to local oscillator 219. The selectable channel demodulator 299 receives, from the data processor and controller 223, a selectable data rate and frequency command signal, which includes data rate information and frequency information for the selectable channels to identify the data rate and frequency of a channel selected by the user or by automatic functions. In response to the selectable data rate and frequency command signal, the selectable channel demodulator 299, using symbol clock 292, adjusts, on initialization and thereafter, the electronics of the selectable channel demodulator 299 to accommodate received signals having various data rates and frequencies. The selectable channel demodulator 299 converts the selectable-IF signal from the RF electronics 215 to an in-phase and a quadrature-phase component, i.e. an in-phase-selectable signal and a quadrature-phase-selectable signal, respectively, using appropriate in-phase and quadrature-phase circuitry in response to frequency synthesizer 297.

The selectable channel demodulator 299 also digitizes the in-phase selectable signal and the quadrature-phase selectable signal using A/D converters 295, 296, and averages or filters the output of A/D converters 295, 296 using symbol devices 293, 294, respectively.

The selectable channel decoder 291 operatively is coupled to the selectable channel demodulator 299. The selectable channel decoder 291 convolutionally decodes and deinterleaves the demodulated in-phase-selectable signal and the quadrature-phase selectable signal from symbol devices 293, 294 as a selectable-data signal. The selectable-data signal is provided to a digital interface and, optionally, to the audio decompressor 225 of FIG. 5.

The data processor and controller 223 of FIG. 5 operatively is coupled to the TDM channel decoder 275, to the RF electronics 215, and to the optional transmitter 211. The data processor and controller 223 includes a programmable, non-volatile memory. The non-volatile memory includes an initialization sequence. When the mobile station is turned on for the first time, the mobile station executes the initialization sequence. In a preferred embodiment of this initialization sequence, the data processor and controller 223 generates the TDM data rate and frequency command signal. The TDM data rate and frequency command signal corresponds to one of the finite sets of frequencies and data rates at which the TDM channel can operate, identified in a TDM channel look-up table stored in the memory of the data processor and controller 223, with the TDM channel look-up table updated periodically through data signals sent through the TDM channel. The TDM channel look-up table contains data rates and radio frequency locations that also may include additional identifying information about the finite sets of frequencies and data rates at which the TDM channel can operate, as illustratively shown in FIG. 9. The TDM data rate and frequency command signal is passed to the TDM channel demodulator and decoder 222.

The data processor and controller 223 receives the TDM-data signal from TDM channel decoder 275, and decommutates the TDM-data signal as a control signal and as paging and other message or information signals. In the preferred embodiment, the decommutation of the TDM-data signal includes time-demultiplexing the TDM-data signal as the control signal and as paging and other message or information signals. The data processor and controller 223 sends the appropriate channel data rates and frequencies to the TDM channel demodulator and decoder 222 through the TDM data rate and frequency command signal, and the data processor and controller sends the appropriate channel data rates and frequencies to the selectable channel demodulator and decoder 221 through the selectable data rate and frequency command signal. The control signals specify the radio frequency location and data rate of each TDM channel and each selectable channel to which the mobile station is intended to have access, as well as the frequency, data rate and allowed time slot for any transmission by the mobile station. The control signals include look-up tables, including a selectable channel look-up table and a TDM channel look-up table, and the control signals also include information needed to set up and execute two-way data and voice communications using the mobile station. Control signals can include additional control information as well, such as location-dependent instructions which are executed by those mobile stations having locations, stored in mobile-station memory, corresponding to the specified location or geographic region associated with the location-dependent instructions. The look-up tables are broadcast periodically. The look-up tables may include the name, radio frequency location, and data rates of the selectable channels and of the TDM channels, and the look-up tables are stored by the data processor and controller 223 in the programmable, non-volatile memory, and the look-up tables are also updated periodically through data broadcasts on the TDM channels. The data processor and controller 223 uses the look-up tables to generate the TDM data rate and frequency command signal, the selectable data rate and frequency command signal, and the transmitter frequency command signal.

The data processor and controller 223 provides data rate information to the data coder and modulator 224, demultiplexes received TDM channel data streams, and sends and receives messages to and from an input device and a message display.

The transmitter frequency command signal includes frequency information for the transmitter 211, and the transmitter frequency command signal is used to select the carrier frequency of transmitter 211. The data processor and controller 223 generates the transmitter frequency command signal from information derived from the TDM channels.

The data processor and controller 223 also stores, in the non-volatile memory, data as needed, outputs message signals to the message display, and generates the selectable data rate and frequency command signal and the TDM data rate and frequency command signal. The data processor and controller 223 may also store, in the non-volatile memory, information relating to the location of the mobile station, whether such information is received in a message or via the input device. The data processor and controller 223 uses data rate and frequency information from the input device or from received messages, including the periodically broadcast TDM channel look-up table, to assign the data rate and frequency to be used by the TDM channel demodulator 282 and TDM channel decoder 275. The data rates and frequencies for the TDM channel are passed from the data processor and controller 223 to the TDM channel demodulator 282 in the TDM data rate and frequency command signal. The data rate and frequency for a chosen one of the selectable channels are passed from the data processor and controller 223 to the selectable channel demodulator 299 in the selectable data rate and frequency command signal. The frequencies for the optional transmitter are passed from the data processor and controller 223 to the transmitter 211 in the transmitter frequency command signal.

The data processor and controller 223 uses the data rate and frequency assignments in the selectable channel look-up table updated periodically through the TDM channel, and uses an input of a selection by the user or automatic functions, to assign the data rates and frequencies to be employed by the selectable channel demodulator 299 and selectable channel decoder 291. These data rates and frequencies are passed from the data processor and controller 223 to the selectable channel demodulator 299 and the selectable channel decoder 291 in the selectable data rate and frequency command signal.

The transmitter frequency command signal is used to select the carrier frequency of the transmitter 211. The data processor and controller 223 also generates a Doppler-correction signal. The Doppler-correction signal includes information for correcting for Doppler shift of the transmitted waveform, which is referred to as the data-modulated signal. The correction for the Doppler shift is derived from analyzing GPS-derived mobile Doppler estimates generated at the mobile station and satellite oscillator drift and return link satellite Doppler compensation estimates generated by the radio satellite network center 117 and sent through MSAT 105 over the TDM channel to the mobile station.

The error can potentially be reduced still further through the use of GPS-derived mobile Doppler estimates generated at the mobile station and with satellite return link Doppler compensation estimates generated by a network center and broadcast to the mobile station. An optional GPS receiver in each of the mobile stations can be used to estimate individual vehicle velocity. The speed of the vehicle towards or away from MSAT 105 may be computed by the data processor and controller 223 using an approximate position of the satellite from information sent over the TDM channel. The calculated speed of a vehicle containing a mobile station 200 can be used by the data processor and controller 223 to calculate mobile Doppler effects on both the downlink and the uplink and to send appropriate adjustments to the TDM channel demodulator 282, to the selectable channel demodulator 299, and to the frequency synthesizer 231 to compensate for frequency errors caused by mobile Doppler effects.

In addition to the use of GPS for estimating vehicle velocity, GPS may also be used as a means of determining location of the mobile station. Location information may then be stored in the mobile station memory and used to identify specific location-dependent instructions, within a wide-area broadcast, relevant to the mobile station. Other position determination devices may also be used to provide location information.

In this configuration, the present invention may be embodied as an electronic device for use as a communications terminal comprising means for determining the location of the electronic device, means for inputting location information on a location of the electronic device to the device, means for storing the location information, means for receiving a wide-area broadcast signal, and means for executing instructions contained within the wide-area broadcast signal, responsive to the stored location.

Determining means may be embodied as a position determination device including a Global Positioning System (GPS) receiver, or as a radio determination device or any other equivalent device or system for calculating geographic location. Inputting means may be embodied as a keyboard, a touchscreen, or any equivalent input device. Inputting means may also include a data channel signal containing location information and transmitted to the electronic device. Such a data channel signal may include a communications control channel signal through which the electronic device receives a list of operating information, including a plurality of channel names, a plurality of data rates, and a plurality of frequencies, for a plurality of selectable channel signals. The instructions received over the data channel signal may identify a specific selectable channel signal, within a plurality of selectable channel signals, to which the electronic device is to be tuned, dependent on the stored location.

Storing means may be embodied as a memory such as the memory contained within the data processor and controller 223. Receiving means may be embodied as a receiver 207 or equivalent structure. Executing means may be embodied as a data processor and controller 223 or equivalent processor.

In use of this embodiment of the present invention having location-determination capability, instructions contained within a wide-area transmitted broadcast signal are received by a plurality of receiving units. The plurality of receiving units may have their respective locations stored in memory or may receive location information as part of the wide-area broadcast. Location information stored in a memory of each receiving unit may be derived from an outside source and then transmitted to the receiving unit as part of a wide-area broadcast signal including a data channel signal, or by other input. Location information may be derived using a position determination device, a radio determination device, or other equivalent device.

Upon receipt of a wide-area broadcast signal, such as a data channel signal, a receiving unit compares stored location information with the plurality of location-dependent instructions contained within the wide-area broadcast to identify location-relevant instructions. Location-relevant instructions are defined to include those instructions associated with a particular location or a particular geographic region, with the particular location or particular geographic region corresponding to location information stored within the receiving unit. Alternatively, the receiving unit may extract from the data channel signal location information specific to the receiving unit, storing the extracted information in memory. However the location information is received, upon receipt of the data channel signal the receiving unit executes only those location-dependent instructions within the data channel signal corresponding to the location information stored in memory. The instructions may be associated with a specific location, with the specific location representing a match with the stored location information or with the specific location being located at a distance from the stored location which is less than a specified range. The instructions may also be associated with a specific geographic region, with the electronic device executing the instructions associated with that specific geographic region, in response to the stored location of the electronic device being within that specific geographic region.

The present invention also includes a method for delivering a data channel signal including location-dependent instructions, from a transmitter to a plurality of receiving units, and for executing particular location-dependent instructions within the data channel signal in response to a respective location of each of the plurality of receiving units. The method comprises the steps of transmitting the data channel signal to the plurality of receiving units, receiving the data channel signal at the plurality of receiving units, and executing particular location-dependent instructions within the data channel signal corresponding to a stored location of the receiving unit. The stored location may be received as part of the data channel signal and then extracted and stored by the receiving unit. The stored location may alternatively be received by other input to the receiving unit, or may be determined internal to the receiving unit, and then compared with the plurality of location-dependent instructions to identify location-relevant instructions. Location-relevant instructions are defined to include those instructions associated with a particular location or a particular geographic region, with the particular location or particular geographic region corresponding to location information stored within the receiving unit. Stored location information may correspond to a particular location or a particular geographic region by matching the particular location, by being within a specified distance from the particular location, or by being encompassed within at least a part of the particular geographic region.

The method of the present invention also includes a method for delivering a data channel signal including location-dependent instructions, from a transmitter to a receiving unit, and for executing particular location-dependent instructions contained within the data channel signal in response to a respective location of the receiving unit. The method comprises the steps of determining a location of the receiving unit, inputting the determined location to the receiving unit, storing the determined location in a memory as a stored location, transmitting the data channel signal to the receiving unit, receiving the data channel signal at the receiving unit, comparing the stored location with the plurality of location-dependent instructions to identify location-relevant instructions, and executing the location-relevant instructions. The step of inputting the determined location to the receiving unit may be omitted if the determined location is determined internal to the receiving unit. The step of inputting the determined location may also be omitted if the determined location is transmitted through the mobile satellite system and included within the data channel signal or other input signal.

Alternatively, the method may comprise the steps of determining a location of the receiving unit, transmitting to the receiving unit the determined location with the data channel signal, receiving the data channel signal at the receiving unit, storing the determined location in a memory of the receiving unit as a stored location, comparing the stored location with the plurality of location-dependent instructions to identify location-relevant instructions, and executing the location-relevant instructions. The location-relevant instructions received over the data channel signal may identify a specific selectable channel signal, within a plurality of selectable channel signals, to which the electronic device is to be tuned, dependent on the stored location.

The radio satellite network center 117 can be used to estimate return link satellite oscillator drift and satellite Doppler effects using various techniques such as, for example, using a reference mobile station/terminal and satellite ephemeris data. The radio satellite network center 117 can then prepare and broadcast return link frequency compensation data over the TDM channel in each beam to each of the mobile stations. The mobile stations can then use the frequency compensation data to adjust transmitter frequency settings as appropriate using the transmitter frequency command signal.

The data processor and controller 223 stores data as needed, outputs message signals to the message display, generates the transmitter frequency command signal to control the carrier signal of the transmitter 211, and generates the selectable data rate and frequency command signal and the TDM data rate and frequency command signal. The data processor and controller 223 uses data rate assignments from the input device or from received messages, including the periodically broadcast look-up tables, to assign the data rate to be used by the TDM channel demodulator 282 and TDM channel decoder 275. The data rates are passed from the data processor and controller 223 to the TDM channel demodulator 282 in the TDM data rate and frequency command signal. The data rates determine the TDM channel demodulator 282 and TDM channel decoder 275 symbol clock rate. A tracking loop in a symbol clock synchronizes the timing signals with the arriving TDM signal, and a carrier tracking loop in the TDM channel demodulator 282 is commanded by the TDM data rate and frequency command signal to synthesize a clock that samples the arriving TDM signals at an appropriate rate.

The data processor and controller 223 also uses the data rate assignments to assign the data rates to be employed by the selectable channel demodulator 299 and the selectable channel decoder 291. These data rates are passed from the data processor and controller 223 to the selectable channel demodulator 299 in the selectable data rate and frequency command signal. The data processor and controller 223 sets the synthesized frequency to be used by the selectable channel demodulator 299 for demodulating the selectable-IF signal. Typically, the synthesized frequency is a harmonic of the symbol clock rate.

The data processor and controller 223 controls the transmission of data. Data from the input device, such as an input panel or a keyset, is formatted into the messages required by the network protocol by the data processor and controller 223 as a formatted data signal and the formatted data signal is provided to the data coder and modulator 224.

When the mobile station is turned on for the first time, the mobile station executes an initialization sequence. In a preferred embodiment of this initialization sequence, the data processor and controller 223 generates the TDM data rate and frequency command signal. The TDM data rate and frequency command signal corresponds to one of the finite sets of frequencies and data rates at which the TDM channel can operate, identified in a TDM channel look-up table held in memory, and passes this signal to the TDM channel demodulator and decoder 222.

The data processor and controller 223 then examines the output of the TDM channel demodulator and decoder 222 to determine if a TDM channel is present at the selected frequency and data rate. If after a predefined period of time the channel has not been identified as a TDM channel, the data processor and controller 223 commands the TDM channel demodulator 282 to tune to another possible TDM channel frequency and again monitors the output of the TDM channel demodulator and decoder 222 to detect whether a TDM channel is present. The data processor and controller 223 continues the tuning and monitoring process until the data processor and controller 223 has detected a TDM channel or until the data processor and controller 223 has examined all possible frequencies and failed to detect a TDM channel.

If the data processor and controller 223 has failed to detect a TDM channel following an examination at all possible frequencies, the data processor and controller 223 sends the TDM data rate and frequency command signal to the TDM channel demodulator and decoder 222 to set the TDM channel demodulator and decoder 222 to another possible TDM data rate. The data processor and controller then sequentially examines all possible TDM frequencies to detect whether a TDM channel is present at the new data rate. This process is continued through all possible combinations of data rate and frequency.

TDM channel look-up tables are assembled periodically by the radio satellite network center 117, as shown in FIG. 1, and sent over the TDM channels in each beam through ground unit antenna 125 and MSAT 105 to all mobile stations. Each TDM channel look-up table contains the frequencies and data rates of the TDM channel of the beam in which the TDM channel is being sent and the TDM channels in each adjacent beam, as well as possible alternatives. Once the data processor and controller 223 determines that the mobile station is tuned to a TDM channel, the data processor and controller 223 monitors the output of the TDM channel demodulator and decoder 222 until a TDM channel look-up table is received. The data processor and controller 223 stores this TDM channel look-up table and then measures the received power of each TDM channel by sequentially tuning to each such channel and monitoring received signal level. Once the received signal levels of all operating TDM channels have been measured, the data processor and controller 223 sets the TDM data rate and frequency command signal so as to receive the strongest TDM channel.

The data processor and controller 223 always stores the most recently received TDM channel look-up table in non-volatile memory. Each time the mobile station is turned off, then back on again, the data processor and controller 223 once again commands the TDM channel demodulator and decoder 222 to tune in to each TDM channel, then compares the strengths of each TDM channel, and finally commands the TDM channel demodulator and decoder 222 to tune in to the strongest TDM channel. By this comparing of strengths of each TDM channel, the TDM channel can normally be selected without having to undergo the entire initialization process described above. TDM channel data rates and frequencies are expected to change infrequently. The carrier signal frequency of the transmitter 211 is set or adjusted by the transmitter frequency command signal from the data processor and controller 223.

While the signals received by the mobile station from satellites include frequency errors caused by Doppler effects from the mobile station, the received signals are much closer to the correct absolute frequency than the locally generated signals, so the frequency-error signal from the TDM channel demodulator can be used by the data processor and controller 223 to generate the transmitter frequency correction signal. The transmitter frequency correction signal is the difference between the detected received frequency and the receive frequency as predicted by the local oscillator 212, along with additional corrections for mobile Doppler effects, satellite Doppler effects, and satellite oscillator drift as described above. The transmitter frequency command signal is generated by the data processor and controller 223 by adding the transmitter frequency correction signal to the transmitter frequency assigned by the radio satellite network center 117, with the assigned transmitter frequency being obtained by the data processor and controller 223 from the broadcast look-up tables. The transmitter frequency correction signal serves to compensate for transmit frequency errors caused by local oscillator drift and other factors.

Figure 8:
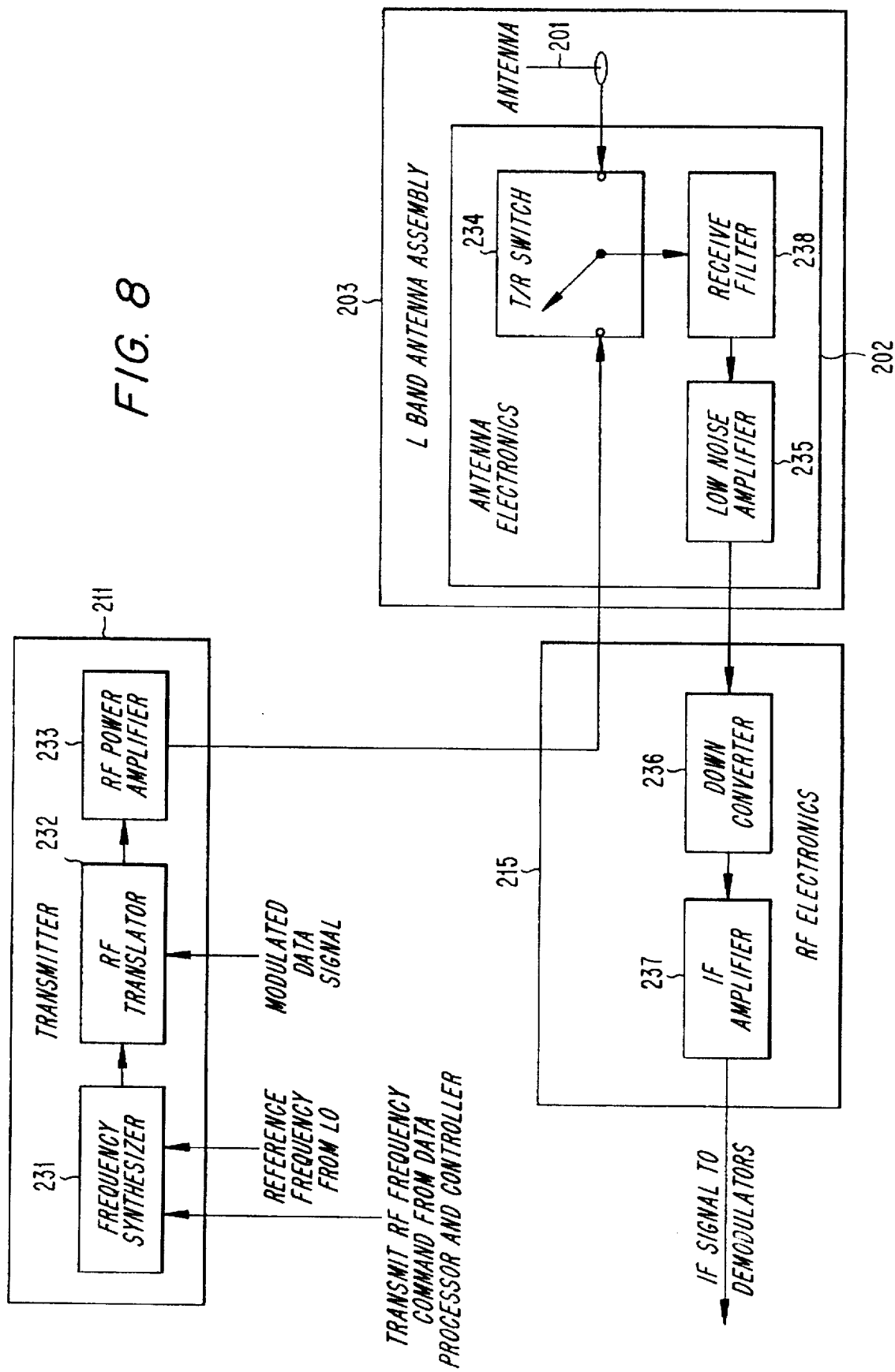
FIG. 8 is a block diagram of a transmitter, RF electronics, and an L-band antenna assembly.

FIG. 8 shows the RF electronics 215, the L-band antenna assembly 203, and the optional transmitter 211. The carrier signal frequency of the transmitter 211 is set or adjusted by the transmitter frequency command signal from the data processor and controller 223. The transmitter 211 converts, from data coder and modulator 224, a data-modulated signal to an amplified data-modulated signal and transmits the amplified data-modulated signal on a carrier signal frequency. The RF translator 232 upconverts the data-modulated signal from data coder and modulator 224 to the carrier signal frequency synthesized by frequency synthesizer 231, generating the data-modulated signal. RF power amplifier 233 amplifies the data-modulated signal from RF translator 232 and sends the amplified signal through RF electronics 215 to the L-band antenna assembly 203 for transmission.

The L-band antenna assembly 203 incorporates antenna electronics 202 and antenna 201. The antenna electronics 202 includes low noise amplifier (LNA) 235, T/R switch 234, and receive filter 238. Signals from MSAT 105 at mobile communications frequencies enter the antenna 201 and are routed through the T/R switch 234 to receive filter 238, which attenuates out-of-band signals, and then to LNA 235. The LNA 235 amplifies the signal from receive filter 238 and forwards the amplified signal to downconverter 236 in RF electronics 215.

The L-band antenna assembly routes amplified transmit signals from RF power amplifier 233, sent by way of RF electronics 215, through T/R switch 234, to antenna 201 and transmits the signals to MSAT 105.

The RF electronics 215 include a downconverter 236, IF amplifiers 237, and appropriate cable connectors. RF electronics 215 downconverts the signal from LNA 235 to an IF frequency, using downconverter 236, and amplifies the resultant IF signal to the TDM channel demodulator 282 and the selectable channel demodulator 299.

FIG. 2 shows the transmitter 211, RF electronics 215, and satellite antenna assembly 203. The transmitter 211 converts, from data coder and modulator 224, the data-modulated signal to the amplified data-modulated signal, and transmits the amplified. data-modulated signal on a carrier signal frequency. The transmitter 211 synthesizes, using the frequency synthesizer, the carrier signal frequency in response to the transmitter frequency command signal from the data processor and controller 223. Also, after the Doppler-correction signal is generated by the data processor and controller 223, as described above, the data processor and controller 223 uses the data included in the Doppler-correction signal to modify the transmitter frequency command signal to control the transmitter 211 in order to adjust the frequency of the carrier signal. An input switch commanded by the data processor and controller 223 selects the data input or the modulated digital voice signal. The RF carrier signal is modulated by the selected data to create the data-modulated signal, which is then amplified and provided to the satellite RF electronics 215.

The data coder and modulator 224 of FIG. 5 operatively is coupled to the data processor and controller 223. The data coder and modulator 224 encodes a formatted data signal from the data processor and controller 223 or from the voice input processor 217 using encoder 261, and modulates an IF frequency the encoded data signal to create a data-modulated signal.

The audio decompressor 225 operatively is coupled to the selectable channel decoder 291. The audio decompressor 225 decompresses the selectable-data signal from selectable channel demodulator and decoder 221. The D/A converter 226 is operatively coupled to the audio decompressor 225. The D/A converter 226 converts the deinterleaved and decompressed selectable-data signal from the audio decompressor 225 to output analog signals such as analog audio programming or voice messages. These analog signals are provided to a handset or to the audio amplifier 209.

The radio satellite network center 117 of FIG. 1 transmits a single TDM channel 24 hours a day in each satellite beam. This channel controls all mobile stations in the beam and contains low rate, typically under 2.4 kbps, data broadcasts such as alphanumeric pages, GPS differential corrections and integrity updates, stock updates, sport reports, travel advisories and emergency alert. An aggregation of messages in the TDM channel can result in an overall higher rate for the TDM channel. The selectable channel look-up table identifying mobile station names, frequencies and data rates of selectable channels is sent through the TDM channel. Also, the TDM channel look-up table updates identifying TDM channel frequencies and data rates for the TDM channel to which the mobile is currently tuned and for TDM channels in adjacent beams, is sent through the TDM channel. Each mobile station receives the TDM channel from the beam in which the mobile station is located at all times when the mobile station is turned on. TDM channels preferably operate with convolutional codes at a forward-error-correction code rate of ¼.

The mobile station can receive transmissions from the radio satellite network center 117, broadcast base stations 115, telephone gateways 111, and dispatch base stations 113 over the selectable channels. The mobile station can receive any digital audio or high rate, 2.4 kbps or higher, data transmission compatible with the radio satellite network. One selectable channel can be received simultaneously with the TDM channel.

Digital audio, facsimile and high rate data broadcast, telephone and voice dispatch transmitters and voice pages are received through the selectable channels. The selectable channels preferably use convolutional forward error correction at a code rate of ½. One-way transmissions through selectable channels are interleaved to mitigate the effects of fades; two-way transmissions are generally not interleaved.

TDM channels and selectable channels operate at variable data rates. By way of example, minimum TDM channel data rate may be 1.2 kbps, maximum may be 108 kbps. Minimum selectable channel data rate may be 2.4 kbps, maximum may be 216 kbps.

Each mobile station requires RF electronics 215 and a communications microchip 214 as illustrated in FIG. 2. The communications microchip 214 incorporates demodulators and decoders for both channels and provides data processing and control functions. The data processor and controller 223 portion of the communications microchip 214 can set up and control two-way data and voice communications. The communications microchip 214 includes a data coder and modulator 224 for use with an optional data transmitter 211. An optional voice input processor 217 can be added for the two-way voice communications. The voice input processor 217 as a chip can include an analog-to-digital converter 216 and a digital compressor 218 as illustrated in FIG. 4.

An optional Global Positioning System (GPS) microchip and associated RF electronics can be added to the mobile station for processing navigation information. The radio satellite network center can insert GPS differential corrections and integrity information into TDM channel data broadcasts, which the communications microchip receives and forwards to the GPS microchip. With differential corrections, the GPS microchip can estimate mobile position to within two meters. GPS position estimates can be sent to dispatchers over the radio satellite system return link, i.e. mobile station to fixed station, data channels. GPS position estimates may also be used for mobile station location determination as discussed earlier relative to the location-determination capability of the present invention and the use of such location-determination capability to implement, at any given mobile station, location-dependent instructions contained within a wide-area broadcast.

The GPS L1 frequency at 1575.42 MHz is between the satellite-to-mobile band, 1529–1559 MHz, and mobile-to-satellite band, 1630.5–1660.5 MHz, of mobile satellite systems presently authorized by the Federal Communications Commission. This proximity to the receive frequencies for the present invention make it possible for a GPS receiver to share the antenna and front end with a radio satellite system mobile station, though some additional RF circuitry is required as well as a GPS microchip. Typical GPS microchips include all base band circuitry necessary for receiving and processing GPS transmissions.

Performance requirements are modest, consistent with mass production and distribution constraints. The antenna can be a small, simple cross-polarized drooping dipole on a microstrip patch. Two-way voice communications require a diplexer instead of switch in the antenna assembly and may require a mobile antenna with a 4 dBi gain rather than 3 dBi to counteract the higher loss through the diplexer.

Typically, the transmitter power radiates two watts, the antenna has a gain of 3 dBi, and the mobile EIRP is 3 dBw, with a mobile G/T=−20 dB/K.

The radio satellite network center 117 assembles control information and incoming data from numerous sources, including pages, differential GPS corrections, electronic device location information, region-specific or location-dependent instructions, messages to individual mobiles, conversation requests, channel assignments, TDM and selectable channel look-up tables, etc., into the TDM channel for each beam. The radio satellite network center 117 encodes and modulates each TDM channel and transmits the modulated TDM channels to mobiles through the MSAT satellite 105. The radio satellite network center 117 also receives transmissions from mobiles equipped with data transmitters and forwards received data to their appropriate destinations.

The radio satellite network center 117 also provides frequency control for the network, as described in "Design of an MSAT-X Transceiver and Related Ground Segment Technology Study Final Report, Volume II: MSAT-X Ground Segment Design", MSAT-X Report No. 131, Jet Propulsion Laboratory, Pasadena, Calif., 1986.

Base stations and gateways communicate with the radio satellite network center 117 through the satellite $K_u$—$K_u$ band link. The radio satellite network center 117 assigns operating frequencies and provides positive control over base station transmitters and gateway transmitters to ensure network integrity.

Broadcasters can operate their own broadcast base stations 115, transmitting a single digital audio or high rate data channel. Digital audio broadcast base stations digitize and compress audio signals, then encode and modulate these signals and transmit them at Ku-band to the satellite 105. The satellite 105 transponds the signals which the satellite receives from the broadcast base stations 115 to the mobile communications frequency and broadcasts them directly to mobile users.

Voice gateways 111 interconnect two-way telephone communications with the telephone network. Operators of voice gateways 111 operate their own facilities under the positive control of the radio satellite network center 117.

Dispatch base stations 113 not interconnected with the telephone network can be used by individual organizations for dispatch communications with fleets of vehicles. Dispatch base stations 113 are also controlled by the radio satellite network center 117. Voice pages can be sent through dispatch base stations 113 operated by paging companies.

The communications microchip is an important element of the present system. The radio satellite system takes advantage of the dramatic increases in processing capabilities of new semiconductor devices to consolidate most of the processing required by its highly sophisticated radios, preferably onto a single chip. This chip can be mass produced for very low cost.

The present invention overcomes the various problems relating to broadcasting of audio programming over the new mobile satellites. This invention, therefore, is expected to have a dramatic impact on the mobile satellite industry.

In use, the mobile station, using the present invention, receives two channels. A primary message/control channel and an arbitrary number of secondary selectable channels are broadcast through the satellite in each beam. The message/control channel is continuous, broadcast 24 hours a day; a given selectable channel may or may not be continuous, depending on how the selectable channel is being used. Each mobile station receives the message/control channel at all times that the receiver is turned on, and can be tuned by its user to simultaneously receive any one of the selectable channels. The message/control channel, from the viewpoint of the user, operates in the background; the message/control channel delivers data information to the mobile station, such as the spectrum location and bandwidth of available selectable channels and other control information relating to operation of the mobile station; differential corrections to improve GPS location computation; electronic device location information; region-specific or location-dependent instruction; messages such as alphanumeric and voice pages; emergency advisories; data bases for such things as traffic accidents, sports scores or stock quotes; and reprogramming information regarding new or modified services. Information in the message/control channel is coded for attention by particular receivers, groups of receivers, or all receivers. Selectable channels could include such things as music, talk shows, or other radio entertainment programming; facsimile transmissions; emergency broadcasts; or the receive portion of a two-way voice communication.

The ability to receive many data services through the message/control channel while tuned to a selectable channel yields great functionality. For example, the mobile station could receive stock updates, weather and sports reports, pages and other messages, traffic reports, and many other sorts of time-critical information, while the user is listening to a music broadcast, receiving a facsimile transmission or engaging in a two-way voice conversation.

Some of the uses of the selectable channels, particularly higher quality music programming, require a relatively high data rate and occupy a significant portion of the spectrum available for mobile satellite services. The design of the microchip processor allows the number, spectrum location and bandwidth of selectable channels to be changed dynamically, through updates provided to mobile stations via the message/control channel. The ability to promptly relocate and reconfigure broadcast channels is required in order to assure that mobile satellite spectrum can be made available for aircraft emergencies or other priority uses of radio frequencies. Dynamic reconfiguration through adjustment of bandwidth is also useful to match bandwidth with technical and economic requirements of a particular broadcast, so that talk shows or emergency communications, for instance, could be provided at lower bandwidth, as well as a resulting lower satellite capacity cost, than music programming. As another example of the utility of this invention, if necessary a given entertainment channel could be quickly divided into a large number of low-quality emergency broadcast channels, all of which could be received by all mobile stations and each of which could be targeted to particular mobile stations or groups of mobile stations. This targeting may be accomplished by including location-dependent instructions which are executed by those mobile stations having locations, stored in mobile-station memory, corresponding to the specified location or geographic region associated with the location-dependent instructions.

The message/control channel is intended to use time-division multiplexing, as the message/control channel carries a potentially large number of relatively low data rate messages, including control information. This channel may, through aggregation of messages, become itself a high data rate channel. Relocation of this channel, if necessary, can be accomplished through a number of means obvious in light of the present invention. The method chosen in describing this invention is to program each mobile station to seek the message/control channel by proceeding through a series of preselected possible frequency locations and data rates.

This invention, therefore, allows rapid frequency relocation of broadcast channels without disruption of service. This invention allows the bandwidth of broadcast channels to be changed rapidly, which could make spectrum available for emergency communications, or be used to adjust bandwidth, as well as the resulting satellite capacity cost, for different sorts of broadcasts. Smaller bandwidths for channels that do not require the high bandwidth of high quality music programming also allows a larger number of channels to be implemented on the system.

Further, the present invention also allows ready integration of a variety of communications services useful to the travelling public, and, through integration with U.S. government Global Positioning System (GPS) microprocessors, navigation services and delivery of location-dependent instructions. This integration allows the radio satellite system operator obtain additional revenue to support the high costs of satellite capacity for the broadcast channels. The flexibility of the present invention allows new services not yet; conceived to be provided to the public in the future, through reprogramming of the data processor and controller 223, delivered through data broadcasts on the TDM channel, without expensive alteration of possibly millions of user mobile stations. The combination of services provided through the present invention results in enhancements to each service and new services that are not otherwise possible.

A significant aspect of the integrated communications terminal of the present invention is the simplicity of the basic system design, which allows common use of the same receiver antenna and RF electronics for a variety of services and which allows the principal components of the receiver to be embodied on a small number of integrated circuits. The basic electronic components of this invention are capable of being implemented on a small number of integrated circuit chips. The components are therefore small enough to be incorporated into current car radios, hand-held radios, and portable radios presently sold in the mass market, such as the portable WALKMAN™ radio/cassette player sold by SONY Corporation, and do not need to be included in bulky add-on equipment.

It will be apparent to those skilled in the art that various modifications can be made to the integrated communications terminal of the instant invention without departing from the scope or spirit of the invention, and it is intended that the present invention cover modifications and variations of the integrated communications terminal provided they come in the scope of the appended claims and their equivalents.

We claim:

1. An electronic device for use as a communications terminal, comprising:

means for receiving a communications control channel signal through which said electronic device receives a list of operating information, including location information on a location of said electronic device, a plurality of channel names, a plurality of data rates, and a plurality of frequencies, for a plurality of selectable channel signals, each of said plurality of channel names associated with a frequency and a data rate as a channel name association, with channel name associations modifiable through updating of the list of operating information;

means for storing the location of said electronic device as a stored location;

means for selecting, by a user, a selectable channel signal by selecting a name of the selectable channel signal as a selectable-channel-signal-name, the selectable channel signal selected dependent on the stored location;

means for identifying a particular frequency and a particular data rate associated with the selectable-channel-signal name from the list of operating information;

means for tuning to the particular frequency and the particular data rate associated with the selectable-channel-signal name; and means for receiving, simultaneously with receipt of said communications control channel signal, the selectable channel signal.

2. The electronic device as set forth in claim 1 further comprising inputting means for inputting location information.

3. The electronic device as set forth in claim 2 with said inputting means including a touchscreen.

4. The electronic device as set forth in claim 2 with said inputting means including a keyboard.

5. The electronic device as set forth in claim 1 wherein the communications control channel signal is time-division-multiplexed.

6. The electronic device as set forth in claim 1 with said communications control channel signal received sequentially with the selectable channel signal.

7. The electronic device as set forth in claim 1 with the selectable channel signal associated with a specific location.

8. The electronic device as set forth in claim 7 with said electronic device executing, responsive to a match between the stored location and the specific location, instructions contained within the communications control channel signal associated with the specific location.

9. The electronic device as set forth in claim 7 with said electronic device executing, responsive to a distance between the stored location and the specific location less than a specified range, instructions contained within the communications control channel signal associated with the specific location.

10. The electronic device as set forth in claim 1 with the selectable channel signal associated with a specific geographic region.

11. The electronic device as set forth in claim 10 with said electronic device executing, responsive to the stored location being within the specific geographic region, instructions associated with the specific geographic region.

12. The electronic device as set forth in claim 1 further comprising:
means for determining a location of said electronic device.

13. The electronic device as set forth in claim 12 with said determining means including a position determination device.

14. The electronic device as set forth in claim 13 with said position determination device including a Global Positioning System receiver.

15. The electronic device as set forth in claim 12 with said determining means including a radio determination system.

16. A mobile communications network, comprising:
a plurality of mobile stations comprised of a plurality of electronic devices, respectively, each of said plurality of electronic devices including,
means for determining location information on a location of said electronic device;
means for storing the location of said electronic device as a stored location;
means for receiving a communications control channel signal through which said electronic device receives a list of operating information for a plurality of selectable channel signals;
means for receiving, simultaneously with receipt of said communications control channel signal, one of the plurality of selectable channel signals, which selectable channel signal said electronic device identifies using the list of operating information provided through the communications control channel signal; and
means for executing instructions contained within the selectable channel signal, responsive to the stored location;
a central station delivering a time-division-multiplexed communications control channel signal to said plurality of mobile stations; and
a plurality of intermediate stations delivering the plurality of selectable channel signals to said plurality of mobile stations.

17. A method for delivering diverse communications services, including location-dependent instructions, from a transmitter at a central station to a plurality of receiving units using a plurality of selectable channels and a common communications control channel, and for executing particular location-dependent instructions responsive to a respective location of each of said plurality of receiving units, comprising the steps of:

transmitting to said plurality of receiving units a communications control channel signal and a variable number of selectable channel signals;
sending to said plurality of receiving units, through said communications control channel signal, data relating to the variable number of selectable channel signals, said data including a plurality of channel names, a plurality of data rates, and a plurality of frequencies, each of said plurality of channel names associated with a frequency and a data rate as a channel name association, with channel name associations modifiable through updating of the communications control channel signal;
receiving, at a receiving unit, the communications control channel signal;
selecting, by a user at said receiving unit, a selectable channel signal by selecting a name of said selectable channel signal as a selectable-channel-signal-name:
extracting, from the selectable channel signal, location information specific to the receiving unit;
storing, at the receiving unit, the extracted location information;
executing, at the receiving unit, particular location-dependent instructions within the selectable channel signal, responsive to the stored extracted location information;
identifying, by the receiving unit using the data relating to the variable number of selectable channel signals, a particular frequency and a particular data rate associated with the selectable-channel-signal name;
tuning, by the receiving unit, to the particular frequency and the particular data rate associated with said selectable-channel-signal name; and
receiving said selectable channel signal at the receiving unit.

18. A method for delivering a data channel signal including a plurality of location-dependent instructions, to at least one micro-electronic device with a radio satellite unit, and for executing particular location-dependent instructions within the plurality of location-dependent instructions, responsive to a respective stored location of said micro-electronic device, comprising the steps of:
initializing said micro-electronic device with location information and initial frequencies and data rates of received signals;
transmitting the data channel signal including the plurality of location-dependent instructions to said micro-electronic device as broadcast transmissions consisting of a time-division-multiplexed channel signal and at least one selectable channel signal;
tuning in on the time-division-multiplexed channel signal;
demodulating the time-division-multiplexed channel signal;
decoding the demodulated time-division-multiplexed channel signal as a time-division-multiplexed data signal;
decommutating the time-division-multiplexed data signal to a control signal, paging signals, and message signals;
extracting from the control signal at least one broadcast channel look-up table comprising channel identification, frequency of operation, and data rate of a plurality of broadcast channels;
receiving selectable channel signals from broadcast transmissions;
comparing, at said micro-electronic device, the respective stored location with the plurality of location-dependent instructions to identify location-relevant instructions;

tuning in, responsive to the location-relevant instructions, on the at least one selectable channel signal; and generating a selectable data rate and frequency command signal and a time-division-multiplexed data rate and frequency command signal in response to said control signal to adjust said micro-electronic device with actual frequencies and data rates of said received broadcast transmissions.

19. The method as set forth in claim 18 with the location-relevant instructions including instructions associated with a particular location, with the particular location matching the respective stored location.

20. The method as set forth in claim 18 with the location-relevant instructions including instructions associated with a particular geographic region, with the particular geographic region encompassing the respective stored location.

21. The method as set forth in claim 18 with the location-relevant instructions including instructions associated with a particular location, with the particular location within a specified distance from the respective stored location.

22. A method using an electronic device for accessing diverse broadcast transmissions including a plurality of location-dependent instructions, and for executing particular location-dependent instructions within the plurality of location-dependent instructions, responsive to a location of said electronic device, comprising the steps of:

determining a location of said electronic device;

inputting the determined location to said electronic device;

storing the determined location in a memory of said electronic device as a stored location;

initializing said electronic device with initial frequencies and data rates of signals to be received, using a channel information database stored in a memory of said electronic device;

receiving signals from broadcast transmissions delivered through various channels;

interpreting a control signal delivered through a control channel, the control signal containing a plurality of location-dependent instructions;

updating the channel information database stored in the memory with information received in the control signal;

comparing, at said electronic device, the stored location with the plurality of location-dependent instructions to identify location-relevant instructions;

generating command signals identifying frequency and data rate of the control signal and of a plurality of selectable channel signals using the channel information data base;

executing, at said electronic device, the location-relevant instructions;

adjusting receive frequencies of said electronic device using said command signals; and receiving the control signal and a chosen one of the plurality of selectable channel signals simultaneously.

* * * * *